United States Patent
Ma et al.

(10) Patent No.: US 8,603,300 B2
(45) Date of Patent: Dec. 10, 2013

(54) FUEL FRACTIONATION USING MEMBRANE DISTILLATION

(75) Inventors: Zidu Ma, Ellington, CT (US); Joseph J. Sangiovanni, West Suffield, CT (US); Zissis A. Dardas, Worcester, MA (US); Meredith B. Colket, III, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/233,890

(22) Filed: Sep. 15, 2011

(65) Prior Publication Data

US 2013/0071793 A1    Mar. 21, 2013

(51) Int. Cl.
*B01D 3/00*    (2006.01)

(52) U.S. Cl.
USPC .................. 203/2; 203/49; 203/71; 203/100; 210/340; 208/347; 196/98

(58) Field of Classification Search
USPC ............. 203/2, 49, 71, 100; 210/640; 196/98; 208/347
See application file for complete search history.

(56) References Cited

U.S. PATENT DOCUMENTS

| | | | |
|---|---|---|---|
| 4,617,126 A | 10/1986 | Funk et al. | |
| 6,361,582 B1 | 3/2002 | Pinnau et al. | |
| 6,896,717 B2 | 5/2005 | Pinnau et al. | |
| 7,608,185 B2 | 10/2009 | Liao et al. | |
| 7,871,520 B2 * | 1/2011 | Ma et al. | 210/640 |
| 8,066,852 B2 * | 11/2011 | Yang et al. | 203/39 |
| 8,287,735 B2 * | 10/2012 | Hanemaaijer et al. | 210/640 |
| 2004/0238343 A1 * | 12/2004 | Kuo et al. | 203/2 |
| 2005/0119517 A1 * | 6/2005 | Millington et al. | 585/818 |
| 2009/0277837 A1 | 11/2009 | Liu et al. | |
| 2010/0051549 A1 | 3/2010 | Ma et al. | |
| 2010/0282680 A1 * | 11/2010 | Su et al. | 210/640 |
| 2011/0049051 A1 * | 3/2011 | Cougard et al. | 210/640 |
| 2011/0180383 A1 * | 7/2011 | Ma et al. | 203/22 |

FOREIGN PATENT DOCUMENTS

EP    1378285 A2    1/2004

OTHER PUBLICATIONS

The extended European Search Report in counterpart European Application No. 12184102.7 filed Sep. 12, 2012.

* cited by examiner

*Primary Examiner* — Nina Bhat
(74) *Attorney, Agent, or Firm* — Kinney & Lange, P.A.

(57) ABSTRACT

A method for fractionating a fuel includes heating the fuel and flowing it through hollow superhydrophobic membranes in a membrane module. Vapor from the fuel permeates the hydrophobic membranes and enters a distillate collection chamber, producing distilled fuel and residual fuel. The residual fuel is removed from the module and cooled. The cooled residual fuel is flowed through hollow tubes in the module and the distilled fuel is removed from the distillate collection chamber. Burning the distilled fuel reduces engine emissions. A fuel fractionation system includes a distillate collection chamber, hollow superhydrophobic membranes, hollow tubes and a distillate outlet. The hollow superhydrophobic membranes receive heated fuel and allow vapor from the heated fuel to permeate the membranes and enter the distillate collection chamber. The hollow tubes receive cooled residual fuel and are positioned to allow vapor in the distillate collection chamber to condense on outer surfaces of the hollow tubes.

9 Claims, 7 Drawing Sheets

FUEL FRACTIONATION USING MEMBRANE DISTILLATION

BACKGROUND

Exhaust gas is emitted by engines as a result of fuel combustion. Exhaust gas typically contains nitrogen, water vapor and carbon dioxide, but can also include carbon monoxide and particulate matter. Particulate matter consists either of solid carbonaceous materials (e.g., soot or non-volatile particulates) or condensed volatile matter which is referred to as volatile particulates. Emissions of both volatile and non-volatile particulates are known to increase with high concentrations of the heavier hydrocarbon fractions in the fuel. Engines that burn fossil fuels tend to produce the most particulate emissions during a cold start. In the case of gasoline engines, most of the particulate emissions are released within the first few minutes of a cold engine start. Similar emission levels are observed in jet engines on aircraft. In addition to cold starts, jet engines produce higher levels of emissions during take off.

Membrane distillation has recently become increasingly popular in a variety of fluid-treatment applications. The membranes are typically hydrophobic and microporous to keep the feed solution separated from that of the distillate during operation. Both hollow fiber and flat sheet membranes have been used in laboratory studies. For membrane distillation, hollow fiber membranes are typically employed in tube/shell configurations, where bundles of hollow fiber membranes are arranged along the longitudinal axes of the modules. Each hollow fiber membrane in the bundle is typically a hydrophobic, microporous membrane having an exterior surface and an inner hollow tubular region. In some membrane distillation systems, the inner hollow tubular regions define a tube side of the module, which serves as a conduit to contain the feed solution. The exterior surfaces of the hollow fiber membranes face a shell side of the module, which provides a region for collecting the distillate fluid separated from the feed solution.

During membrane distillation, the feed solution is typically heated to form a temperature differential across the hollow fiber membranes. This temperature differential creates a vapor pressure differential between the tube side and the shell side of the membranes in the module, which causes a portion of the feed solution to evaporate near the pore entrance on the feed solution side and the vapor to transmit through the hollow fiber membranes. The transmitted vapor then condenses at a gas/liquid interface near the pore entrance of the membranes on the distillate side, thereby providing the desired distillate. According to the present invention, membrane distillation concepts can be used to reduce engine emissions.

SUMMARY

A method for fractionating a fuel includes heating the fuel and flowing the fuel through a plurality of hollow fiber superhydrophobic membranes in a membrane module. Vapor from the fuel permeates the superhydrophobic membranes and enters a distillate collection chamber, producing a distilled fuel in the distillate collection chamber and a residual fuel within the hollow fiber superhydrophobic membranes. The method also includes removing the residual fuel from the membrane module, cooling the residual fuel to produce a cooled residual fuel, flowing the cooled residual fuel through a plurality of hollow tubes in the membrane module and removing the distilled fuel from the distillate collection chamber.

A method for reducing emissions from an engine includes generating a light hydrocarbon fuel fraction and combusting the light hydrocarbon fuel fraction in place of the fuel. The light hydrocarbon fuel fraction is generated by heating the fuel and flowing the fuel through a plurality of hollow fiber superhydrophobic membranes in a membrane module. Vapor from the fuel permeates the superhydrophobic membranes and enters a distillate collection chamber, producing a distilled fuel in the distillate collection chamber and a residual fuel within the hollow fiber superhydrophobic membranes. The residual fuel is removed from the membrane module and cooled to produce a cooled residual fuel. The cooled residual fuel flows through a plurality of hollow tubes in the membrane module and the distilled fuel is removed from the distillate collection chamber to produce the light hydrocarbon fuel fraction.

A fuel fractionation system includes a feed loop for providing a supply of heated fuel, a recuperating loop for providing a supply of cooled residual fuel and a membrane module. The membrane module includes a distillate collection chamber, a plurality of hollow fiber superhydrophobic membranes extending through the distillate collection chamber, a plurality of hollow tubes extending through the distillate collection chamber and a distillate outlet for removing distilled fuel from the distillate collection chamber. The hollow fiber superhydrophobic membranes receive heated fuel from the feed loop and allow vapor from the heated fuel to permeate the hydrophobic membranes and enter the distillate collection chamber. The hollow tubes extend through the distillate collection chamber, receive cooled residual fuel from the recuperating loop and are positioned to allow vapor in the distillate collection chamber to condense on outer surfaces of the hollow tubes.

DETAILED DESCRIPTION

The present invention provides a fuel fractionation system and method utilizing membrane distillation. Membrane distillation fractionates fuel as lighter fuel hydrocarbons permeate a membrane more quickly and readily than heavier fuel hydrocarbons. The resulting distilled fuel possesses fuel hydrocarbons having shorter carbon chain lengths than untreated fuel. This distilled fuel can be combusted during cold engine starts and take offs to reduce the engine's particulate emissions. While the present invention provides benefits to aircraft in particular, any fossil fuel burning engine can profit.

Figure 1:
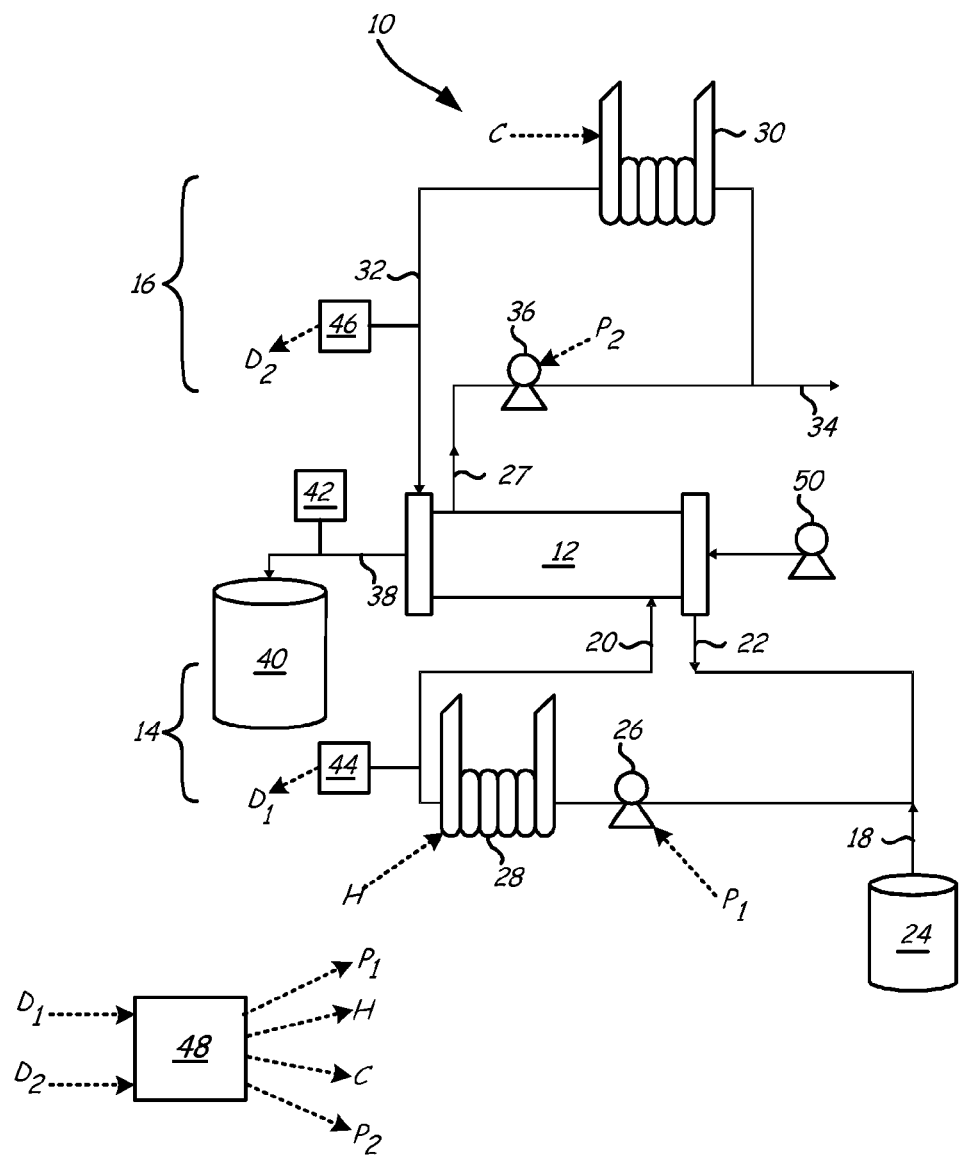
FIG. 1 is a schematic illustration of a membrane distillation system for fuel fractionation.

FIG. 1 is a schematic illustration of distillation system 10, which includes contactor module 12, feed loop 14 and cooling loop 16. Contactor module 12 is shown in greater detail in FIG. 2. Distillation system 10 also includes standard fluid processing equipment (not shown), such as process control units, fluid pumps, and filters. Distillation system 10 is a suitable system for fractionating a fuel.

Feed loop 14 provides fuel to contactor module 12 at an elevated temperature. Feed loop 14 is a fluid pathway for the fuel and includes fuel source line 18, fuel inlet line 20, fuel outlet line 22, fuel supply 24, fluid pump 26, and heat exchanger 28. Fuel source line 18 is a valve-controlled fluid conduit for transferring fuel from fuel supply 24 to feed loop 14. During operation of distillation system 10, components of the fuel are separated within contactor module 12 to provide a distillate. Fuel source line 18 provides additional fuel to mix with a residual fuel exiting contactor module 12 and balance the flow of fuel in feed loop 14.

Fuel in feed loop 14 generally flows in a clockwise direction in the embodiment shown in FIG. 1. Fuel inlet line 20 is a fluid conduit that interconnects feed loop 14 and contactor module 12, thereby allowing fuel to flow into contactor module 12. Fuel outlet line 22 is a fluid conduit that interconnects contactor module 12 to feed loop 14. This allows residual fuel to exit contactor module 12 and reenter feed loop 14.

Fuel supply 24 is a container that supplies fuel into feed loop 14 by way of fuel source line 18. Fuel supply 24 provides a reservoir of fuel for the system. Additional fuel can be supplied to feed loop 14 to balance the volume of distillate produced within contactor module 12 or maintain pressure within feed loop 14. When additional fuel is needed, fuel from fuel supply 24 is added to feed loop 14. Fluid pump 26 delivers the fuel within feed loop 14 to contactor module 12.

Heat exchanger 28 is a heat-providing heat exchanger, which increases the temperature of the fuel passing through feed loop 14. Heat exchanger 28 heats the fuel to an elevated temperature before it enters contactor module 12. As discussed in greater detail below, heating the fuel allows the fuel to enter contactor module 12 at an elevated temperature to increase the separation rate within contactor module 12.

Some membrane materials are sensitive to thermal degradation. Thus, the elevated temperature of the fuel entering contactor module 12 should be balanced to provide a high vapor pressure driving force for distillation while limiting the thermal degradation of membranes within contactor module 12. This reduces the risk of damaging contactor module 12 during operation. Examples of suitable elevated temperatures for the fuel ranges from about 20° C. to about 160° C., with particularly suitable elevated temperatures ranging from about 30° C. to about 100° C. The particular temperature range depends on the fraction of light components the process is designed to separate from the fuel. While distillation system 10 is shown with a single heat exchanger (i.e., heat exchanger 28), distillation system 10 may alternatively include multiple heat exchangers to heat the fuel to an elevated temperature.

Cooling loop 16 provides cooled residual fuel to contactor module 12 at a reduced temperature. Cooling loop 16 is a fluid pathway for the residual fuel and includes residual fuel outlet line 27, heat exchanger 30, residual fuel inlet line 32 and discharge line 34. Cooling loop 16 also optionally includes fluid pump 36. In some embodiments, fluid pump 26 of feed loop 14 provides enough pressure to drive the system without the need for an additional pump in cooling loop 16.

Cooling loop 16 provides a flow of cool fluid (residual fuel) to contactor module 12 to assist the distillation process. Heat exchanger 30 is a cooling heat exchanger that lowers the temperature of the residual fuel flowing through cooling loop 16. Suitable lowered temperatures for the residual concentrated fuel vary depending on the composition of the residual fuel. Suitable lowered temperatures range from about 15° C. to about 30° C.

Residual fuel in cooling loop 16 generally flows in a counter-clockwise direction in the embodiment shown in FIG. 1. Optional fluid pump 36 circulates the residual fuel within cooling loop 16. Residual fuel outlet line 27 and residual fuel inlet line 32 function as residual fuel outlet and inlet lines for contactor module 12, respectively. Discharge line 34 is a valve-controlled fluid conduit for purging a portion of the residual fuel when necessary.

As described in greater detail below, distillate exits contactor module 12 via distillate outlet line 38, and is subsequently collected in collection tank 40 as distillate product (e.g., fuel having lighter hydrocarbons than the fuel delivered to distillation system 10 from fuel supply 24). Collection tank 40 is a container suitable for receiving the distillate obtained from contactor module 12. Alternatively, distillate outlet line 38, can deliver fuel directly to an engine.

Distillate outlet line 38 can include flow transducer 42 to monitor the flow of distillate through distillate outlet line 38 and into collection tank 40. The information collected from flow transducer 42 can be used to regulate the addition of additional fuel to feed loop 14 via fuel source line 18. This allows distillation system 10 to operate in a steady state and at optimal efficiency. Additional fuel is also added to feed loop 14 via fuel source line 18 to account for any residual fuel removed from cooling loop 16 through discharge line 34. If discharge line 34 is closed, no residual fuel is removed and all of the residual concentrated fuel is returned to contactor module 12 and feed loop 14.

Contactor module 12, feed loop 14 or cooling loop 16 optionally include temperature and/or pressure transducers to monitor the temperature and/or pressure of fuel flowing through distillation system 10. FIG. 1 illustrates one embodiment in which transducer systems 44 and 46 monitor temperature and pressure of the fuel in feed loop 14 and the residual fuel in cooling loop 16, respectively. Information obtained from transducer systems 44 and 46 (D1 and D2, respectively) is delivered to controller 48. Controller 48 delivers instructions (P1, H, C, P2) to fluid pumps 26 and 36 and heat exchangers 28 and 30 based on this information so that distillation system 10 is operating at appropriate temperatures and pressures as indicated above.

Optionally, distillation system 10 also includes distillate recirculation pump 50. FIG. 1 illustrates distillate recirculation pump 50 in fluid communication with contactor module 12. Distillate recirculation pump 50 recirculates the distillate within the distillate collection section of contactor module 12. Distillate recirculation pump 50 can enhance heat transfer within contactor module 12 by recirculating the distillate. The distillate can also be cooled while recirculating outside contactor module 12. Because the recirculating distillate has a lower temperature than the fuel, a vapor pressure differential is created and drives distillation. Distillate recirculation pump 50 can also aid in the collection of distillate by directing distillate towards distillate outlet line 38.

Contactor module 12 separates distilled fuel (distillate) from the heated fuel delivered by feed loop 14 via vapor pressure differentials. The combination of the cooled residual fuel and the heated fuel flowing into contactor module 12 creates temperature differentials within the contactor module 12. These temperature differentials create corresponding vapor pressure differentials. The vapor pressure differentials drive the separation rate of distilled fuel from the heated fuel.

The cooled residual fuel serves as a coolant to condense distilled fuel vapor in contactor module 12. As described in greater detail below, contactor module 12 is divided into shell side 51, first tube side 53, and second tube side 55, where shell side 51 is in fluid communication with a distillate outlet 78, first tube side 53 is in fluid communication with feed loop 14, and second tube side 55 is in fluid communication with cooling loop 16.

Figure 2:
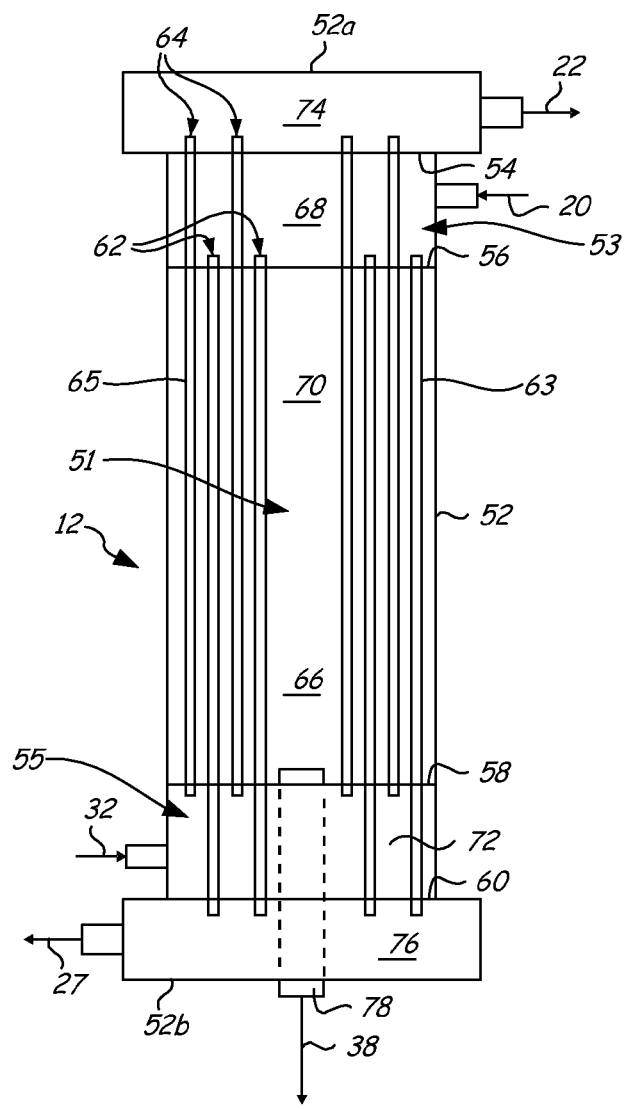
FIG. 2 is a schematic illustration of one embodiment of a membrane distillation module.

FIG. 2 is a schematic illustration of one embodiment of contactor module 12. Contactor module 12 includes outer casing 52, potting resin walls 54, 56, 58, and 60, hollow fiber superhydrophobic membranes 62 (first tubes) and hollow recuperators 64 (second tubes). Outer casing 52 is a rigid structure and defines interior region 66 of contactor module 12. Interior region 66 of contactor module 12 shown in FIG. 2 has three chambers: first chamber 68, second (contactor) chamber 70, and third chamber 72. Outer casing 52 also includes couplings (not shown) for connecting contactor module 12 to fuel inlet line 20, residual fuel outlet line 27, residual fuel inlet line 32, fuel outlet line 22 and distillate outlet line 46.

Potting resin walls 54, 56, 58, and 60 are formed from one or more sealant materials, such as polyurethane and epoxy-based materials. Accordingly, potting resin walls 54, 56, 58, and 60 divide interior region 66 into first chamber 68, contactor chamber 70, and third chamber 72. First manifold 74 is a chamber disposed between first manifold casing 52a and potting resin wall 54, and communicates with fuel outlet line 22 in the embodiment illustrated in FIG. 2. First chamber 68 is disposed between potting resin walls 54 and 56 within outer casing 52 and communicates with fuel inlet line 20. Contactor chamber 70 is disposed between potting resin walls 56 and 58 within outer casing 52 and communicates with distillate outlet line 38. Third chamber 72 is disposed between potting resin walls 58 and 60 within outer casing 52 and communicates with residual fuel inlet line 32. Second manifold 76 is disposed between second manifold casing 52b and potting resin wall 60 and communicates with residual fuel outlet line 27. As discussed below, contactor chamber 70 is the section of contactor module 12 where the distillate separates from the heated fuel. Distillate outlet 78 connects contactor chamber 70 and distillate outlet line 38.

In exemplary embodiments, contactor module 12 is a replaceable unit in which opposing ends of contactor module 12 engage with first manifold 74 and second manifold 76. Once contactor module 12 no longer operates as desired, contactor module 12 can be easily removed and replaced with a new contactor module 12. Alternatively, contactor module 12, first manifold 74 and second manifold 76 can function as a single replaceable unit.

According to the embodiment illustrated in FIG. 2, hollow fiber superhydrophobic membranes 62 are a plurality of tubular membranes that extend between second chamber 68 and third chamber 72. Hollow fiber superhydrophobic membranes 62 are formed from one or more hydrophobic materials that are capable of separating light fuel hydrocarbons (hydrocarbons having a low number of carbon atoms) from the fuel via vapor pressure differentials. Hollow fiber superhydrophobic membranes 62 and hollow recuperators 64 are generally arranged proximately to each other throughout the volume of interior region 66 to provide a large total membrane surface area and optimal vapor pressure differentials. In the embodiment illustrated in FIG. 2, hollow fiber superhydrophobic membranes 62 and hollow recuperators 64 substantially fill the open volume of contactor chamber 70 in a spiral wound configuration (shown in FIG. 3A). This allows the distillate to conduct thermal energy from hollow fiber superhydrophobic membranes 62 to hollow recuperators 64. Alternatively, contactor chamber 70 may be occupied by hollow fiber superhydrophobic membranes 62 and hollow recuperators 64 in an alternate layered (stacked) configuration (shown in FIG. 3B) to provide thermal energy transfer from hollow fiber superhydrophobic membranes 62 to recuperators 64 through the distillate.

According to the embodiment illustrated in FIG. 2, hollow fiber superhydrophobic membranes 62 each include an inner hollow region that extends through potting resin walls 56, 58 and 60. This provides a flow path on first tube side 53 for the heated fuel between first chamber 68 and second manifold 76 (i.e., the heated fuel flows through the inner hollow regions of hollow fiber superhydrophobic membranes 62). Conversely, the flow path on shell side 51 extends through the interstitial spaces between exterior surfaces 63 of hollow fiber superhydrophobic membranes 62 and exterior surfaces 65 of hollow recuperators 64, within contactor chamber 70.

Hollow recuperators 64 are a plurality of hollow tubes that extend between first manifold 74 and third chamber 72. Hollow recuperators 64 are longitudinally offset from hollow fiber superhydrophobic membranes 62. Hollow recuperators 64 have non-porous and solid walls, which prevent the transfer of distillate to the residual fuel and the transfer of residual fuel to the distillate. Hollow recuperators 64 are spaced throughout the volume of interior region 66 near the hollow fiber superhydrophobic membranes 62. During operation, the space between hollow fiber superhydrophobic membranes 62 and hollow recuperators 64 can be filled with liquid fuel. The liquid fuel-filled space increases heat transfer from the surfaces of hollow fiber superhydrophobic membranes 62 to the surfaces of hollow recuperators 64. This significantly increases the thermal efficiency of contactor module 12. In one embodiment, hollow fiber superhydrophobic membranes 62 and hollow recuperators 64 substantially fill the open volume of contactor chamber 70. Alternatively, one or more portions of contactor chamber 70 may be unoccupied by hollow fiber superhydrophobic membranes 62 and/or hollow recuperators 64, thereby providing larger flow paths for distillate. FIG. 3B illustrates an alternate embodiment in which hollow fiber superhydrophobic membranes 62 and hollow recuperators 64 are absent from the center of contactor chamber 70 to allow room for distillate outlet 78.

According to the embodiment illustrated in FIG. 2, hollow recuperators 64 each include an inner hollow region that extends through potting resin walls 54, 56 and 58. This provides a flow path on second tube side 55 for the cooled residual fuel between third chamber 72 and first manifold 74 (i.e., the cooled residual fuel flows through the inner hollow regions of hollow recuperators 64). While FIG. 2 illustrates contactor module 12 in which hollow fiber superhydrophobic membranes 62 and hollow recuperators 64 extend from and through specific chambers and manifolds, alternate configurations exist.

When present, optional distillate recirculation pump 50 is in fluid communication with contactor chamber 70. Distillate recirculation pump 50 provides means for recirculating distillate within contactor chamber 70. Distillate can be collected during recirculation. Recirculation can increase mixing on shell side 51 of contactor module 12, which increases the vapor pressure differential between first tube side 53 and shell side 51. Distillate recirculation pump 50 can be configured to direct a suitable fluid (e.g., collected distillate) into contactor chamber 70. This fluid drives the distillate which has condensed on shell side 51 of hollow fiber superhydrophobic membranes 62 and hollow recuperators 64 towards distillate outlet 78 and distillate outlet line 38 for collection.

By driving the distillate towards distillate outlet 78, mixing on shell side 51 is increased, thereby increasing the vapor pressure differential between first tube side 53 and shell side 51 and, thus, increasing the rate at which distillate is separated from the heated fuel by hollow fiber superhydrophobic membranes 62.

While distillation system 10 is shown with a single contactor module (contactor module 12), distillation system 10 may alternatively include additional contactor modules 12. Contactor modules 12 can be arranged in serial configurations, parallel configurations, and combinations thereof.

Figure 3A:
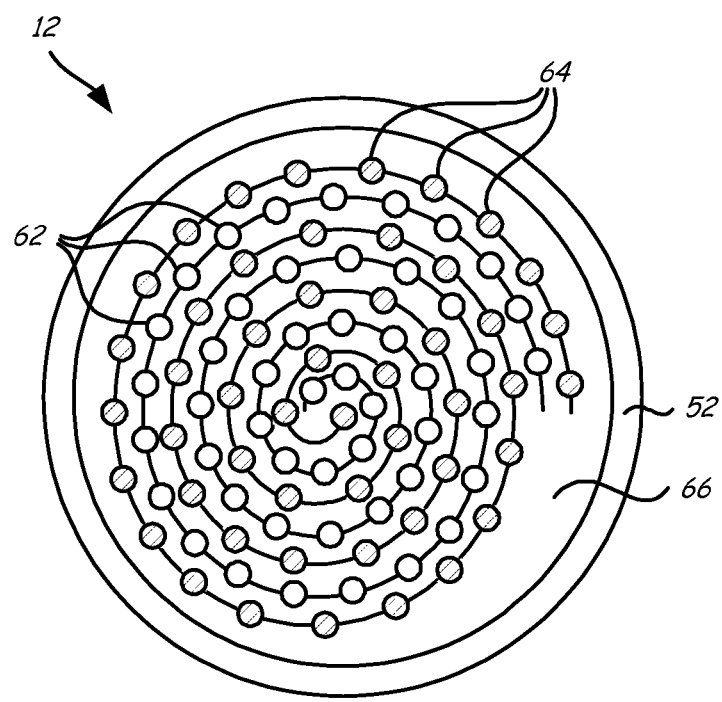
FIG. 3A is a cross section view of one embodiment of an interior of the membrane distillation module of FIG. 2.
Figure 3B:
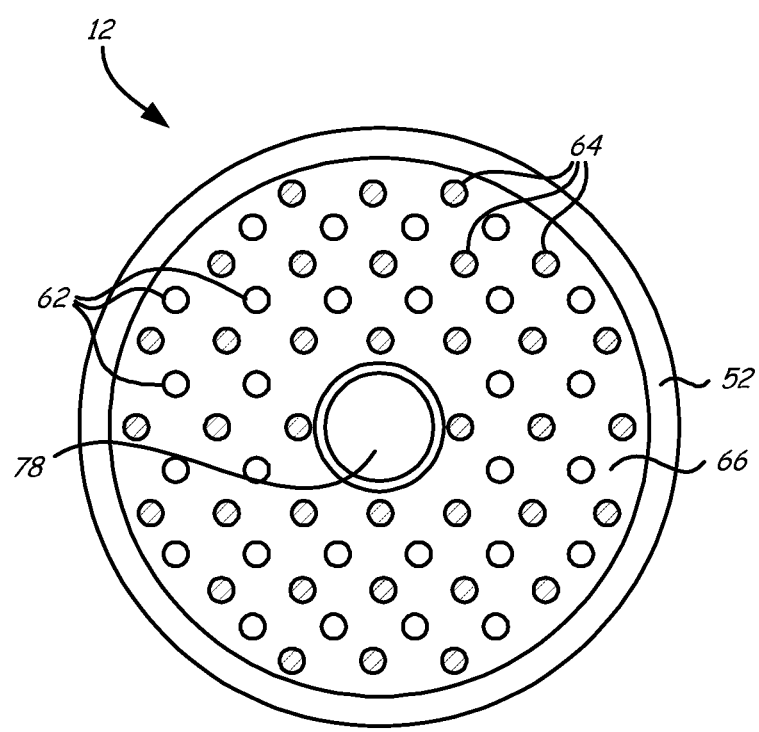
FIG. 3B is a cross section view of an alternate embodiment of the interior of the membrane distillation module of FIG. 2.

FIG. 3A shows a cross section of one embodiment of contactor module 12, illustrating an exemplary contactor module 12 where hollow fiber superhydrophobic membranes 62 and hollow recuperators 64 are arranged in a spiral wound configuration. Hollow fiber superhydrophobic membranes 62, which have hydrophobic membrane walls, are spaced throughout interior region 66 and are indicated in FIG. 3A by open circles. The volume inside of hollow fiber superhydrophobic membranes 62 is on first tube side 53. Hollow recuperators 64, which have non-porous and solid walls, are also spaced throughout interior region 66 and are indicated in FIG. 3A by hatched circles. The volume inside of hollow recuperators 64 is on second tube side 55. The interstitial volume outside and between hollow fiber superhydrophobic membranes 62 and hollow recuperators 64 within the interior region 66 is on shell side 51 of contactor module 12. Each hollow fiber superhydrophobic membranes 62 is located proximately to a hollow recuperator 64 and vice versa. This configuration provides for optimal temperature differentials between first tube side 53 and shell side 51. Other embodiments of contactor module 12 may have an alternate layered (stacked) arrangement of hollow fiber superhydrophobic membranes 62 and hollow recuperators 64 (shown in FIG. 3B). The hollow fiber superhydrophobic membranes 62 and hollow recuperators 64 in all embodiments function in the same manner, as described below.

For ease of manufacture and assembly, one or more groups of hollow fiber superhydrophobic membranes 62 may be attached to fabric layers at predetermined intervals. Hollow recuperators 64 may also be attached to separate fabric layers at predetermined intervals. The layers of hollow fiber superhydrophobic membranes 62 and hollow recuperators 64 can be arranged side by side and wound in a spiral fashion within the interior region as illustrated in FIG. 3A. This configuration provides for proximity of hollow fiber superhydrophobic membranes 62 and hollow recuperators 64. In this configuration, potting resin walls 54, 56, 58, and 60 can be formed according to the method described in U.S. Pat. No. 5,284,584, in which high-strength, solvent resistant thermoplastic resin is extruded onto the groups of hollow fiber superhydrophobic membranes 62 and hollow recuperators 64. Additionally, alternating layers (stacks) of grouped hollow fiber superhydrophobic membranes 62 and grouped hollow recuperators 64 may be used to provide the embodiment illustrated in FIG. 3B.

Fuel heated to an elevated temperature in feed loop 14 is flowed through hollow fiber superhydrophobic membranes 62. Due to vapor pressure differentials between first tube side 53 and shell side 51, distillate separates from the heated fuel within hollow fiber superhydrophobic membranes 62 (first tube side 53) and the distillate crosses the hollow fiber superhydrophobic membranes 62 into the interstitial volume of interior region 66 (shell side 51). Meanwhile, residual fuel cooled in cooling loop 16 is flowed through hollow recuperators 64 (second tube side 55). Because of temperature differentials between second tube side 55 and shell side 51, the cooled residual fuel on second tube side 55 absorbs heat energy from the warmer distillate or air in the interstitial volume of interior region 66 across hollow recuperators 64, thereby cooling the distillate or air on shell side 51.

Contactor modules 12 can operate in liquid gap or air gap modes. In both operational modes, first tube side 53 and shell side 51 are separated by a hydrophobic membrane (hollow fiber superhydrophobic membranes 62) and first tube side 53 contains the heated fuel. In liquid gap mode, liquid distillate is allowed to contact exterior surfaces 63 of hollow fiber superhydrophobic membranes 62 and exterior surfaces 65 of hollow recuperators 64 within the distillate collection section. This differs from the operation of a module using air gap mode. In air gap mode, liquid distillate contact with exterior surfaces 63 (the surfaces of superhydrophobic membranes 62) is avoided.

In liquid gap mode, shell side 51 of contactor module 12 contains a liquid (distillate). Shell side 51 also contains condensing surfaces that have a temperature lower than first tube side 53. According to the present invention, these condensing surfaces include exterior surfaces 63 of hollow fiber superhydrophobic membranes 62 and exterior surfaces 65 of hollow recuperators 64. Hollow recuperators 64 (second tube side 55) contain cooled residual fuel that is at a lower temperature than the heated fuel flowing within hollow fiber superhydrophobic membranes 62 (first tube side 51). The fuel flowing within hollow recuperators 64 cools the distillate in shell side 51, creating a vapor pressure differential between first tube side 53 and cooler shell side 51. This vapor pressure differential causes transport of part of the heated fuel from first tube side 53 (hollow fiber superhydrophobic membranes 62) to shell side 51. The part of the heated fuel transported across hollow fiber superhydrophobic membranes 62 then condenses on shell side 51 on exterior surfaces 63 of hollow fiber superhydrophobic membranes 62 and then joins with the distillate and can be collected. In air gap mode, shell side 51 of contactor module 12 contains a gas (air) rather than a liquid. The part of the heated fuel transported across the hollow fiber superhydrophobic membranes 62 condenses on shell side 51 on exterior surfaces 65 of hollow recuperators 64 through which cooled fuel flows.

During operation, the heated fuel flows from feed loop 14 to first tube side 53 of contactor module 12. While the heated fuel flows through first tube side 53 of contactor module 12, the lighter hydrocarbon components of the heated fuel evaporate and the resulting vapor is transported across hollow fiber superhydrophobic membranes 62 to shell side 51 of contactor module 12 and a fuel containing generally heavier hydrocarbon components remains as residual. The vapor condenses on shell side 51 on exterior surfaces 63 of hollow fiber superhydrophobic membranes 62 (liquid gap mode) or exterior surfaces 65 of hollow recuperators 64 (air gap mode). The residual fuel exits first tube side 53 of contactor module 12 and enters cooling loop 16 where it is cooled. The cooled residual fuel flows from cooling loop 16 to second tube side 55 of contactor module 12. While the cooled residual fuel flows through second tube side 55 of contactor module 12, heat transfers from the vapor and condensate on shell side 51 of contactor module 12 to second tube side 55 (the cooled residual fuel). The cooled residual fuel exits second tube side 55 of contactor module 12 and reenters feed loop 14.

The operation of distillation system 10 will be described in greater detail with reference to the embodiment of FIG. 2. For the purposes of illustration, operation of distillation system 10 in liquid gap mode will be described. Differences between liquid gap mode and air gap mode, where applicable, are provided below. Note that alternate embodiments, while having the same number of chambers as the embodiment of FIG. 2, may have chambers that perform different functions from those of the embodiment of FIG. 2, but each embodiment of the present invention will include one or more chambers that provides each function described below.

During operation, the heated fuel enters first chamber 68 via fuel inlet line 20. The heated fuel is then directed to hollow fiber superhydrophobic membranes 62. The fuel enters hollow fiber superhydrophobic membranes 62 on first tube side 53 and travels towards second manifold 76 and residual fuel outlet line 27. At the same time, cooled residual fuel enters third chamber 72 via residual fuel inlet line 32, and flows through the inner hollow regions of hollow recuperators 64 on second tube side 55 toward first manifold 74 and fuel outlet line 22. As the cooled residual fuel flows through the inner hollows of hollow recuperators 64, the temperature differentials between the interior surfaces and exterior surfaces 65 of hollow recuperators 64 allows for the transfer of thermal energy within contactor chamber 70. Since, the cooled residual fuel has a temperature lower than the distillate on shell side 51 of contactor module 12, the cooled residual fuel absorbs thermal energy across the walls of hollow recuperators 64. The cooled residual fuel on second tube side 55 is thereby warmed and the distillate on shell side 51 is cooled. The residual fuel traveling through hollow recuperators 64 is warmed as it passes through contactor module 12. This residual fuel exits contactor module 12 at first manifold 74 through fuel outlet line 22 and returns to feed loop 14 where it is heated and returned to contactor module 12 as heated fuel. The passage of residual fuel through hollow recuperators 64 allows the residual fuel to be preheated before it reaches heat exchanger 28 of feed loop 14. The preheating of residual fuel provides for heat recuperation and a reduction in energy needed to heat the fuel before it enters contactor module 12.

As the heated fuel flows through the inner hollows of hollow fiber superhydrophobic membranes 62, the temperature differentials between the interior and exterior surfaces of hollow fiber superhydrophobic membranes 62 (first tube side 53 and shell side 51, respectively) create vapor pressure differentials across hollow fiber superhydrophobic membranes 62 within contactor chamber 70. The vapor pressure differentials allow vapor from the heated fuel in hollow fiber superhydrophobic membranes 62 to be transported from first tube side 53 of hollow fiber superhydrophobic membranes 62 to shell side 51 and condense as distillate. Distillate separates from the heated fuel and passes across hollow fiber superhydrophobic membranes 62 from first tube side 53 to shell side 51. For example, a heated fuel entering first tube side 53 of contactor module 12 at about 85° C. and a cooled residual fuel entering second tube side 55 of contactor module 12 at about 20° C. provide a temperature differential of about 55° C. between the first and second tube sides. As the cooled residual fuel on second tube side 55 cools the distillate on shell side 51, the temperature differential between first tube side 53 and shell side 51 increases. This correspondingly increases the separation rate of the distillate from the heated fuel, where the separated distillate transfers from first tube side 53 to shell side 51 of contactor module 12.

As discussed above, the elevated temperature of the fuel on first tube side 53 and the reduced temperature of the distillate on shell side 51 substantially increase the vapor pressure differentials across hollow fiber superhydrophobic membranes 62, thereby increasing the separation rate of distillate from the fuel. The vapor pressure differentials cause lighter fuel hydrocarbons in the fuel to evaporate and transmit across hollow fiber superhydrophobic membranes 62. When the vapor passes from the inner hollow regions of hollow fiber superhydrophobic membranes 62 into shell side 51 of interior region 66, the cooled supply of distillate causes the vapor to condense near the pore entrances at exterior surfaces 63 of hollow fiber superhydrophobic membranes 62 (liquid gap mode) or exterior surfaces 65 of hollow recuperators 64 (air gap mode) in interior region 66 and mix with the distillate already present. As discussed below, in some embodiments, the exterior of the hollow fiber superhydrophobic membranes 62 are hydrophobic. The hydrophobic exterior of hollow fiber superhydrophobic membranes 62 prevents distillate from recrossing the membranes and rejoining the fuel on first tube side 53 of hollow fiber superhydrophobic membranes 62. Due to system pressure and/or gravity, the distillate flows toward distillate outlet 78 once it enters shell side 51, and proceeds to distillate outlet line 38.

The fuel generally remains in a liquid phase while flowing through first tube side 53 of contactor module 12, within the interior surfaces of hollow fiber superhydrophobic membranes 62. The fuel is maintained in a liquid phase to prevent any contaminants in the fuel or heavier fuel hydrocarbons from entering shell side 51 and mixing with the distillate in the distillate collection section. This could reduce the purity of the distillate or nullify the system's ability to fractionate the fuel. The pressure of the fuel entering contactor module 12 should be less than a liquid penetration pressure of hollow fiber superhydrophobic membranes 62. The liquid penetration pressure is the pressure at which liquid from the fuel forcibly penetrates through hollow fiber superhydrophobic membranes 62 (i.e., from first tube side 53 to shell side 51), and is a function of several factors, such as membrane thickness and the average liquid contact angle of the membranes (i.e., hydrophobicity of the membranes). Liquid penetration of the fuel from first tube side 53 into shell side 51 of contactor module 12 may result in the contamination of the distillate, thereby reducing the purity of the distillate. The hydrophobic surface of hollow fiber superhydrophobic membranes 62 (first tubes) keeps larger fuel hydrocarbons from crossing the membranes while allowing vapor transport from first tube side 53 to shell side 51 of contactor module 12. Additionally, the pressure of the heated fuel entering contactor module 12 is also less than the liquid penetration pressure of hollow fiber superhydrophobic membranes 62. If the pressure of the heated fuel exceeds the liquid penetration pressure of hollow fiber superhydrophobic membranes 62, components of the heated fuel may be forced across hollow fiber superhydrophobic membranes 62 into shell side 51 of contactor module 12. Accordingly, the temperature and pressure of the heated fuel entering contactor module 12 are balanced using controller 48 to prevent liquid penetration of the heated fuel across hollow fiber superhydrophobic membranes 62.

Figure 4:
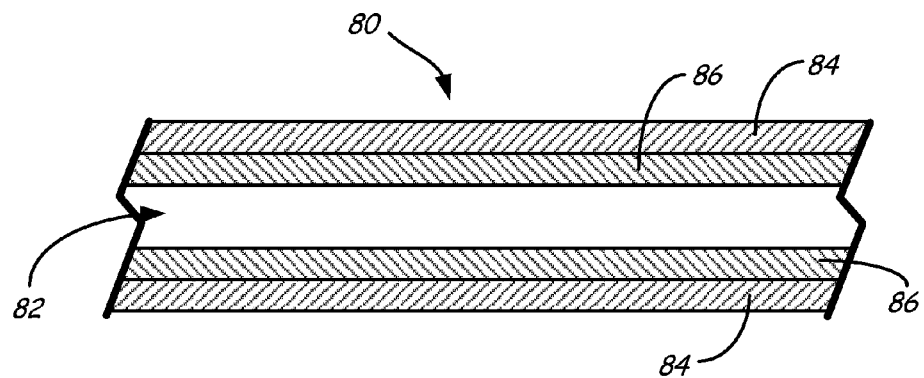
FIG. 4 is an expanded sectional view of one embodiment of a hollow fiber superhydrophobic membrane configured to allow vapor transmission.

FIG. 4 is an expanded sectional view of membrane 80, which is an example of a single membrane of hollow fiber superhydrophobic membranes 62 (shown in FIG. 2). As shown in FIG. 4, membrane 80 includes inner hollow region 82, membrane wall 84 and membrane coating (superhydrophobic layer) 86. Membrane wall 84 is a porous support formed from one or more hydrophobic materials and includes a plurality of pores (not shown) that allow the transmission of gases and vapors. These structural features allow distillate vapor that has crossed membrane coating 86 to enter shell side 51 of contactor chamber 70. Examples of suitable wall thicknesses for membrane wall 84 range from about 50 microns to about 700 microns, with particularly suitable wall thicknesses ranging from about 70 microns to about 500 microns. Examples of suitable materials for membrane wall 84 include ceramics, metals, polymeric materials such as polypropylenes, polyethylenes, polysulfones, polyethersulfones, polyetheretherketones, polyimides, polyphenylene sulfides, polytetrafluoroethylenes, polyvinylidene difluorides, and combinations thereof.

Membrane coating (superhydrophobic layer) 86 desirably covers the entire interior surface of membrane wall 84. Membrane coating 86 is a non-porous coating that imparts additional hydrophobicity to membrane 80, thereby slowing the mass transfer of larger fuel hydrocarbons across membrane 80 into shell side 51 of contactor chamber 70. Suitable materials for membrane coating 86 include polytetrafluoroethylenes, parylenes (poly(p-xylylene) polymers) and combinations thereof. Membrane coating 86 is not porous. That is, membrane coating 86 does not contain pores that are continuous from one side of coating 86 to the other side. As with any surface, membrane coating 86 may contain indentations on the coating surface, and membrane coating 86 may contain angstrom size pores between coating molecules. For the purposes of this application, these features are not considered "pores". Examples of suitable wall thicknesses for membrane coating 86 range from about 0.01 microns to about 0.2 microns, with particularly suitable wall thicknesses ranging from about 0.01 microns to about 0.1 microns, depending on the average pore size of membrane wall 84. Membrane walls 84 with large average pore sizes require thicker membrane coatings 86.

In order for membrane 80 to effectively block the transmission of liquid hydrocarbons across the membrane, membrane coating 86 must possess a surface energy lower than the surface tension of the fuel flowing through hollow fiber superhydrophobic membranes 62, if the coating is porous. Otherwise a nonporous membrane coating 86 must be used. Additionally, membrane wall 84 can be textured to reduce the surface energy of membrane 80. The pore size or pore shape of the pores within membrane wall 84 can be used to modify the hydrophobicity (i.e. surface energy) of membrane 80. For example, decreasing the pore size of the pores within membrane wall 84 increases the hydrophobicity of membrane wall 84 and subsequently increases the hydrophobicity of membrane 80.

Membrane coating 86 can be formed on membrane wall 84 using a variety of coating techniques, such as vapor phase deposition, slurry coating and surface polymerization. Vapor phase deposition, a deposition technique generally requiring high temperatures, can be used where membrane wall 84 is ceramic, metallic or a combination thereof. A combination of slurry coating and surface polymerization, techniques that can be performed at lower temperatures, can be used where membrane wall 84 is polymeric, ceramic, metallic or a combination thereof. In alternative embodiments, the surface pores of membrane wall 84 can be filled with a hydrophobic material to prevent the transmission of liquid fuel hydrocarbons. In liquid gap mode, membrane coating 86 can be present on both side of support membrane 84.

As discussed above, while within contactor chamber 70, the heated fuel flows through inner hollow region 82 of membrane 80 and the cooler distillate flows adjacent to the exterior surface of membrane wall 84. This creates a vapor pressure differential across membrane 80, allowing distillate fluid vapor to penetrate through membrane coating 86 and the pores of membrane wall 84 into shell side 51 of contactor chamber 70. Correspondingly, the distillate fluid vapor carries latent heat from the heated fuel to the distillate fluid within shell side 51 of contactor chamber 70. Additionally, thermal energy also conductively transfers across membrane coating 86 and membrane wall 84 from the heated fuel to the distillate fluid within shell side 51 of contactor chamber 70.

Due to the extremely hydrophobic property of membrane coating (superhydrophobic layer) 86, liquid fuel will not penetrate the membrane pores and vapor containing lighter fuel hydrocarbons transmits across membrane 80 more readily and more quickly than the heavier fuel hydrocarbons present in the heated fuel. As a result, the distillate is a distilled fuel that possesses fuel hydrocarbons having generally shorter carbon chain lengths than the fuel delivered to distillation system 10 from fuel supply 24. The relative distribution of carbon chain lengths present in the distilled fuel can be modified by adjusting the temperature of the heated fuel. The vapor pressure differential across membranes 80 can be controlled by regulating the temperature of the heated fuel flowing through hollow fiber superhydrophobic membranes 62 and the temperature of the cooled residual fuel flowing through hollow recuperators 64 and/or the temperature of the distillate present within shell side 51 of contactor chamber 70.

Figure 5:
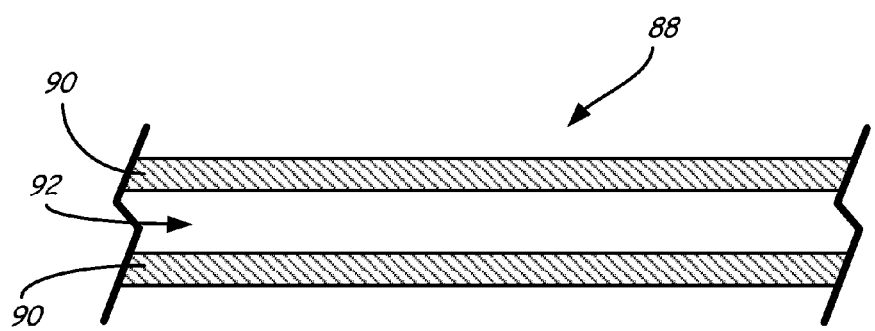
FIG. 5 is an expanded sectional view of one embodiment of a hollow tube configured to prevent vapor transmission but allow thermal transmission.

FIG. 5 is an expanded sectional view of non-porous hollow tube 88, which is an example of a single hollow recuperator 64 (shown in FIG. 2). As shown in FIG. 5, non-porous hollow tube 88 includes a non-porous and solid wall 90 and inner hollow region 92. Solid wall 90 is made up of a non-porous material that blocks the transmission of gases and vapors, thereby preventing mass (fluid) transfer across non-porous hollow tube 88. Suitable materials for non-porous hollow tubes 88 include polymeric materials that possess high thermal conductivity and are stable to heat and aqueous solutions. Other suitable materials may include materials that can tolerate the thermal stress provided by the system and are resistant to corrosion in hydrocarbon environments. Examples include ceramics and metals, such as stainless steel.

Figure 6:
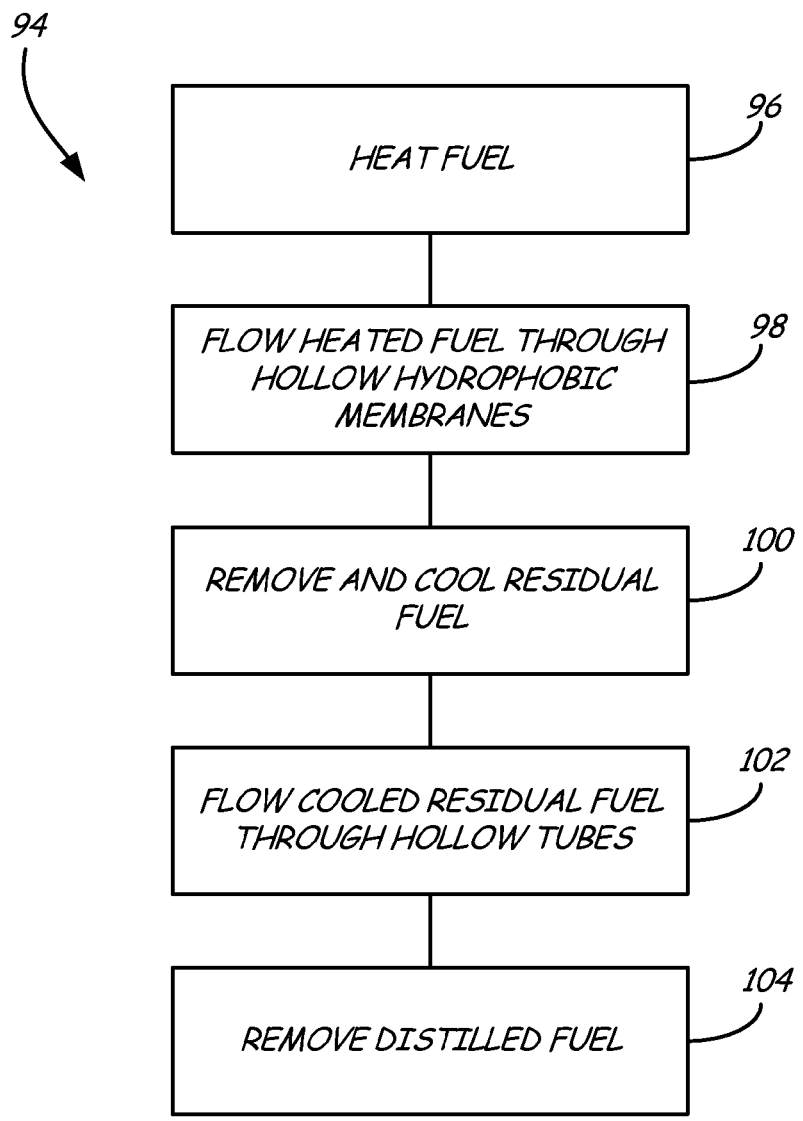
FIG. 6 is a simplified flow diagram illustrating a method for fractionating fuel.

Distillation system 10 operates to fractionate a fuel. FIG. 6 illustrates the steps of method 94, a method for fractionating a fuel. Method 94 includes heating the fuel in step 96. Method 94 also includes flowing the heated fuel through a plurality of hollow fiber superhydrophobic membranes 62 in a membrane module (contactor module 12) in step 98. Vapor from the heated fuel permeates the hollow fiber superhydrophobic membranes 62 and enters a distillate collection chamber (shell side 51 of contactor chamber 70), producing a distilled fuel in the distillate collection chamber and a residual fuel in the hollow fiber superhydrophobic membranes 62. In step 100, the residual fuel is removed from contactor module 12 and cooled in cooling loop 16 to produce a cooled residual fuel. In step 102, the cooled residual fuel is flowed through a plurality of hollow tubes (hollow recuperators 64) in contactor module 12. In step 104, distilled fuel is removed from shell side 51 of contactor chamber 70 via distillate outlet 78 and distillate outlet line 38.

Distillation system 10 also provides a method for reducing emissions from an engine. Lighter fuel hydrocarbons tend to produce lower levels of particulate emissions than ordinary fuel. By burning the lighter hydrocarbons obtained as distillate from distillation system 10, particulate emissions can be reduced during cold engine starts and aircraft takeoff. The lighter hydrocarbons can also be used as the fuel source at other times to reduce emissions, such as taxiing and idling at airports. Distillation system 10 can be operated on board an aircraft or other vehicle or at a location separate from the engine. On board systems can profit by utilizing heat generated by the engine in conjunction with heat exchanger 28 and/or ram air as a source of cooling for heat exchanger 30. Distilled fuel produced by distillation system 10 during normal engine operation can be stored on board for later use during cold engine starts or take off.

Figure 7:
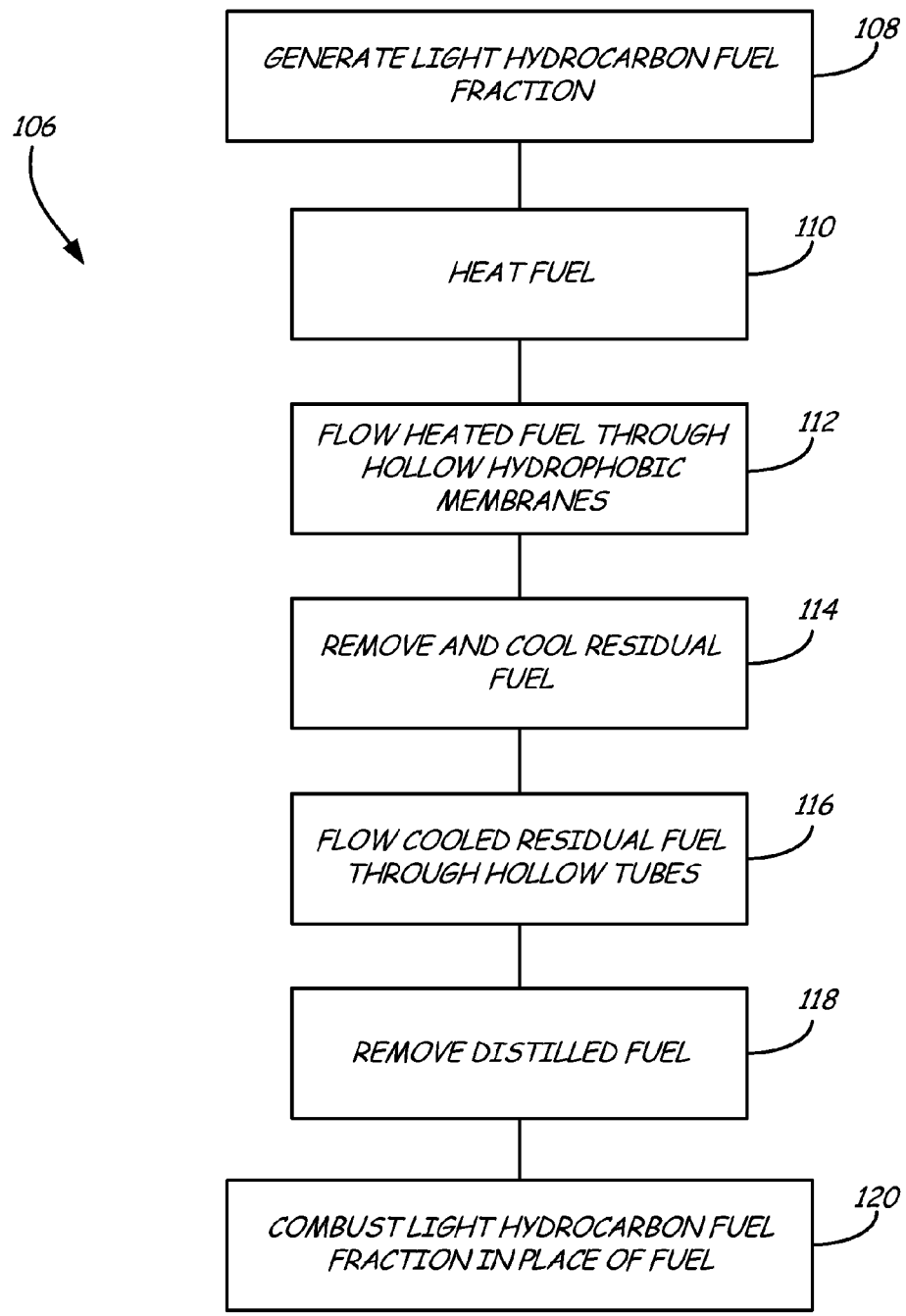
FIG. 7 is a simplified flow diagram illustrating a method for reducing jet engine emissions.

FIG. 7 illustrates the steps of method 106, a method for reducing emissions from an engine. Method 106 includes generating a light hydrocarbon fuel fraction in step 108. Step 108 includes heating the fuel in substep 110 and flowing the heated fuel through a plurality of hollow fiber superhydrophobic membranes 62 in a membrane module (contactor module 12) in substep 112. Vapor from the heated fuel permeates the hollow fiber superhydrophobic membranes 62 and enters a distillate collection chamber (from shell side 51 of contactor chamber 70), producing a distilled fuel in the distillate collection chamber and a residual fuel in the hollow fiber superhydrophobic membranes 62. In substep 114, the residual fuel is removed from contactor module 12 and cooled in cooling loop 16 to produce a cooled residual fuel. In substep 116, the cooled residual fuel is flowed through a plurality of hollow tubes (hollow recuperators 64) in contactor module 12. In substep 118, distilled fuel is removed from shell side 51 of contactor chamber 70 via distillate outlet 78 and distillate outlet line 38. Method 106 also includes combusting the light hydrocarbon fuel fraction produced in step 108 in step 120.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for fractionating a fuel, the method comprising:
heating the fuel;
flowing the fuel through a plurality of hollow superhydrophobic membranes in a membrane module, wherein each hollow superhydrophobic membrane comprises a porous support and a superhydrophobic layer free of pores that extend from one side of the superhydrophobic layer to the other, and wherein vapor from the fuel permeates the superhydrophobic membranes and enters a distillate collection chamber, producing a distilled fuel in the distillate collection chamber and a residual fuel within the hollow superhydrophobic membranes;
removing the residual fuel from the membrane module;
cooling the residual fuel to produce a cooled residual fuel;
flowing the cooled residual fuel through a plurality of hollow tubes in the membrane module; and
removing the distilled fuel from the distillate collection chamber.

2. The method of claim 1, wherein the superhydrophobic layer is selected from the group consisting of polytetrafluoroethylenes, parylenes and combinations thereof.

3. The method of claim 1, wherein the hollow fiber support is porous and has an average pore diameter between about 0.1 microns and about 0.6 microns, and wherein the superhydrophobic layer has a thickness between about 0.01 microns and about 0.1 microns.

4. The method of claim 1, wherein the superhydrophobic layer is applied to the hollow fiber support by a process selected from the group consisting of vapor phase deposition, slurry coating, surface polymerization and combinations thereof.

5. The method of claim 1, wherein the fuel has a surface tension and the superhydrophobic layer has a surface energy density lower than the fuel surface tension.

6. The method of claim 1, wherein a surface of the hollow fiber support is textured to reduce the surface energy of the superhydrophobic layer.

7. The method of claim 1, wherein the fuel is heated to a temperature between about 70° C. and about 90° C., and wherein the residual fuel is cooled to a temperature between about 15° C. and about 30° C.

8. The method of claim 1, wherein the distilled fuel condenses on exterior surfaces of the hollow superhydrophobic membranes.

9. The method of claim 1, wherein the fuel comprises fuel hydrocarbons and the distilled fuel comprises distilled fuel hydrocarbons, and wherein the distilled fuel hydrocarbons have an average carbon number lower than the fuel hydrocarbons.

* * * * *